US012451285B2

(12) United States Patent
Zhang et al.

(10) Patent No.: US 12,451,285 B2

(45) Date of Patent: Oct. 21, 2025

(54) INDUCTOR SKELETON STRUCTURE, INDUCTANCE DEVICE AND LUMINAIRE

(71) Applicants: SUZHOU OPPLE LIGHTING CO., LTD., Suzhou (CN); OPPLE LIGHTING CO., LTD., Shanghai (CN)

(72) Inventors: Xianwei Zhang, Suzhou (CN); Xiao Jiao, Suzhou (CN); Pingwei Zhang, Suzhou (CN); Yisheng Xiao, Suzhou (CN)

(73) Assignees: SUZHOU OPPLE LIGHTING CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 887 days.

(21) Appl. No.: 17/563,003

(22) Filed: Dec. 27, 2021

(65) Prior Publication Data

US 2022/0122759 A1 Apr. 21, 2022

Related U.S. Application Data

(63) Continuation of application No. PCT/CN2020/112838, filed on Sep. 1, 2020.

(30) Foreign Application Priority Data

Sep. 9, 2019 (CN) ......................... 201910846720.2
Sep. 9, 2019 (CN) ......................... 201921493365.7

(51) Int. Cl.
*H01F 27/28* (2006.01)
*F21V 23/00* (2015.01)
(Continued)

(52) U.S. Cl.
CPC .......... *H01F 27/289* (2013.01); *F21V 23/005* (2013.01); *H01F 17/045* (2013.01); *H01F 27/06* (2013.01); *H01F 27/306* (2013.01)

(58) Field of Classification Search
CPC ...... H01F 27/289; H01F 17/045; H01F 27/06; H01F 27/306; H01F 27/266; H01F 27/2828; H01F 27/198; F21V 23/005; F21V 23/02
See application file for complete search history.

(56) References Cited

U.S. PATENT DOCUMENTS 6,788,181 B2 * 9/2004 Yeh ........................ H01F 27/027
336/200

FOREIGN PATENT DOCUMENTS

CN 102537781 A 7/2012
CN 203366953 U 12/2013
(Continued)

OTHER PUBLICATIONS

International Search Report of PCT Application No. PCT/CN2020/112838 dated Nov. 27, 2020 with English translation, (5p).

*Primary Examiner* — Tuyen T Nguyen

(74) *Attorney, Agent, or Firm* — Arch & Lake LLP; Shen Wang; Hao Tan

(57) ABSTRACT

An inductor skeleton structure includes a pedestal and a main winding part. The pedestal includes a base, a fixing part and an auxiliary winding part, the fixing part is disposed on the base, and the auxiliary winding part is extended away from the base from a side surface; the main winding part has a main winding groove; the main winding part is fixed on a side of the base by the fixing part; the auxiliary winding part is used for winding an auxiliary coil capable of covering at least a portion of the welding surface; and the auxiliary coil is flush with or beyond the fitting surface.

17 Claims, 6 Drawing Sheets

(51) Int. Cl.

| | |
|---|---|
| ***H01F 17/04*** | (2006.01) |
| ***H01F 27/06*** | (2006.01) |
| ***H01F 27/30*** | (2006.01) |

(56) References Cited

FOREIGN PATENT DOCUMENTS

| | | | | |
|---|---|---|---|---|
| CN | 108831715 A | * 11/2018 | | ............. H01F 17/04 |
| CN | 208352091 U | 1/2019 | | |
| CN | 110120295 A | 8/2019 | | |
| CN | 110534320 A | 12/2019 | | |
| CN | 210325481 U | 4/2020 | | |
| KR | 20120070229 A | 6/2012 | | |

* cited by examiner

INDUCTOR SKELETON STRUCTURE, INDUCTANCE DEVICE AND LUMINAIRE

CROSS REFERENCE TO RELATED APPLICATIONS

This application is based upon and claims the priority of PCT patent application No. PCT/CN2020/112838 filed on Sep. 1, 2020, which claims priority to Chinese Patent Application No. CN201910846720.2 filed on Sep. 9, 2019, and Chinese Utility Model Patent Application No. CN201921493365.7 filed on Sep. 9, 2019, the entire contents of which are hereby incorporated by reference herein for all purposes.

TECHNICAL FIELD

The present disclosure relates to the field of inductance device manufacturing technology, especially relates to an inductor skeleton structure, an inductance device and a luminaire.

BACKGROUND

Inductance devices are components that can convert electrical energy into magnetic energy and store the magnetic energy, and have been widely used in various electronic products such as aerospace, aviation, communication and household appliances. An inductance device is generally composed of a skeleton, a winding, etc. inductor skeletons in the prior art come in a variety of types, such as I-shaped inductance devices.

SUMMARY

The present disclosure provides an inductor skeleton structure and an inductance device.

In the first aspect, the present disclosure provides an inductor skeleton structure, comprising a pedestal and a main winding part. The pedestal comprises a base, a fixing part, and an auxiliary winding part, the fixing part is disposed on the base, the base comprises a downward fitting surface and a circumferential side surface surrounding the fitting surface, and the auxiliary winding part is extended away from the base from the side surface; the main winding part has a main winding groove for winding a main coil; the main winding part is fixed on a side, which is facing away from the fitting surface, of the base by the fixing part; a downward surface of the auxiliary winding part is a welding surface, and the auxiliary winding part is used for winding an auxiliary coil capable of covering at least a portion of the welding surface; and the welding surface and the fitting surface are configured such that the auxiliary coil covering the welding surface is flush with or beyond the fitting surface.

In the second aspect, the present disclosure provides an inductance device, comprising a main coil, an auxiliary coil, and the above-mentioned inductor skeleton structure. The main coil is wound within the main winding groove, and the auxiliary coil is wound around the auxiliary winding part and covers the portion of the welding surface.

In the third aspect, the present disclosure provides a luminaire, comprising a lamp, a light source module and a driving module. The light source module and the driving module are both disposed on the lamp and electrically connected to each other; the driving module comprises a driving board; and the above-mentioned inductance device is disposed on the driving board.

It is to be understood that the foregoing general description and the following detailed description are exemplary and explanatory only and are not restrictive of the disclosure.

BRIEF DESCRIPTION OF DRAWINGS

The accompanying drawings described herein are provided for further understanding of the present disclosure, and constitute a part of the present disclosure. Examples of the present disclosure and descriptions thereof are intended to explain the present disclosure, but do not constitute inappropriate limitations to the present disclosure. In the drawings.

DETAILED DESCRIPTION

Figure 1:
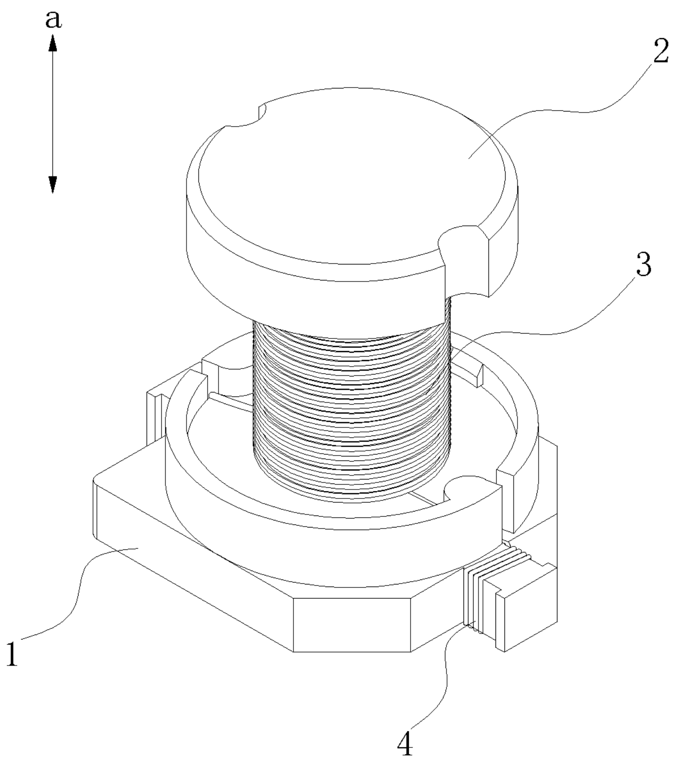
FIG. 1 is an overall assembly view of an inductance device provided in one example of the present disclosure.

Examples of the present disclosure will be described below in combination with the accompanying drawings of the present disclosure. Apparently, the described examples are merely a part rather than all the examples of the present disclosure. All other examples that are derived from the examples of the present disclosure by an ordinary skilled in the art without creative efforts shall fall within the protection scope of the present disclosure. The reference numerals in the accompanying drawings are merely used to distinguish different steps in technical solutions from each other, rather than delimiting execution orders of the steps. The specific execution order may be referred to the description in the present disclosure.

Terms used in the present disclosure are merely for describing specific examples and are not intended to limit the present disclosure. The singular forms “one”, “the”, and “this” used in the present disclosure and the appended claims are also intended to include a multiple form, unless other meanings are clearly represented in the context. It should also be understood that the term “and/or” used in the present disclosure refers to any or all of possible combinations including one or more associated listed items.

Reference throughout this specification to “one embodiment,” “an embodiment,” “an example,” “some embodiments,” “some examples,” or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

List of Reference Numerals:

1-pedestal, 10-base, 100-bearing surface, 102-fitting surface, 104-side surface, 106-bottom surface, 108-support foot, 12-fixing part/fixing receptacle, 120-wall, 121-bottom, 122-opening, 124-wire passing gap, 126-circumferential limit piece, 128-clasp, 14-auxiliary winding part, 140-welding surface, 141, 142, 144-vertical surface, 143-surface, 145-limit structure/limit groove, 2-main winding part, 20-main winding groove, 22-upper end portion, 220-adsorption surface, 24-lower end portion, 240-circumferential limit matching piece, 26-main body portion, 3-main coil, 4-auxiliary coil.

Inductance devices in related technologies usually use pins as electrical connectors. It is necessary to pass the pins through pads of a printed circuit board (PCB) before welding.

With the development of assembly technology, surface-mounted electronic devices are increasingly favored by people because they are suitable for automated assembly with high production efficiency. However, an urgent problem to be solved in the art is how to make inductance devices applicable to the surface mount technology.

An example of the present disclosure discloses an inductance device, as shown in FIG. 1, including a pedestal 1, a main winding part 2, a main coil 3, and an auxiliary coil 4.

As shown in FIG. 2 to FIG. 5, the pedestal 1 includes a base 10, a fixing part 12, and an auxiliary winding part 14. The base 10 typically has a flat structure and includes a bearing surface 100, a fitting surface 102 facing away from the bearing surface 100, and a circumferential side surface 104 surrounding the bearing surface 100. A contour defined by the side surface 104 may be square (see FIG. 7), circular (see FIG. 8) or in other regular or irregular shapes (see FIG. 1 to FIG. 5). The fixing part 12 is typically disposed on one side of the bearing surface 100. The fixing part 12 may be fixedly connected to the bearing surface 100 and may also be fixedly connected to the side surface 104 and stretch over the bearing surface 100.

Figure 2:
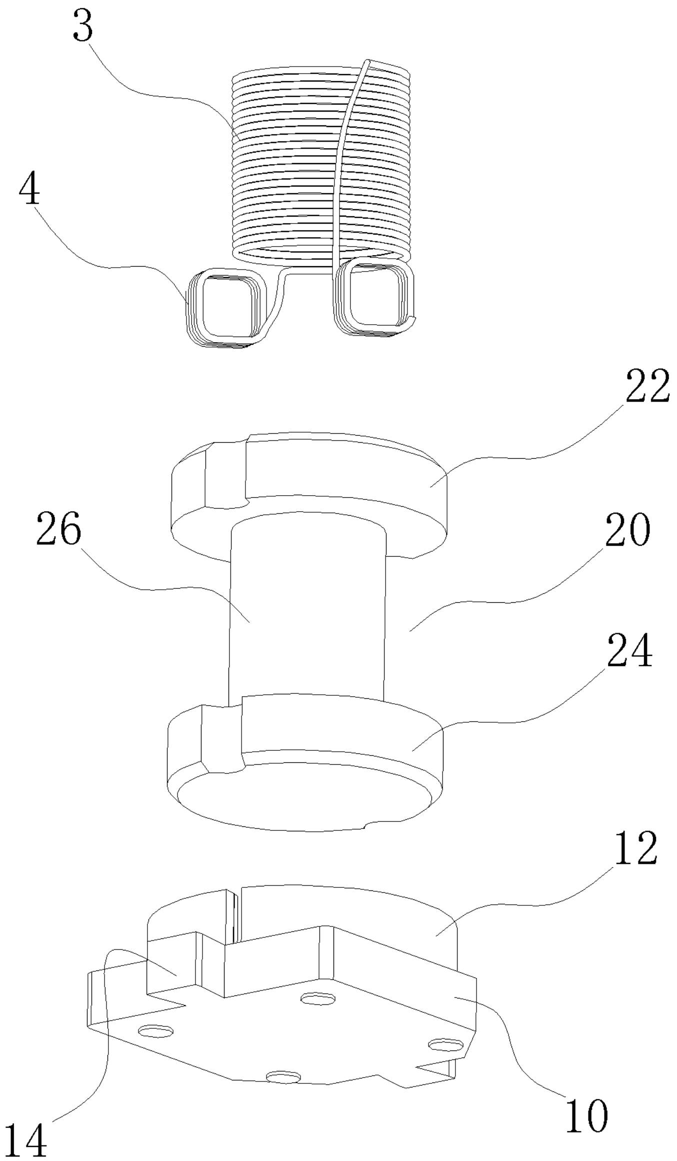
FIG. 2 is an exploded view of an inductance device provided in one example of the present disclosure.
Figure 3:
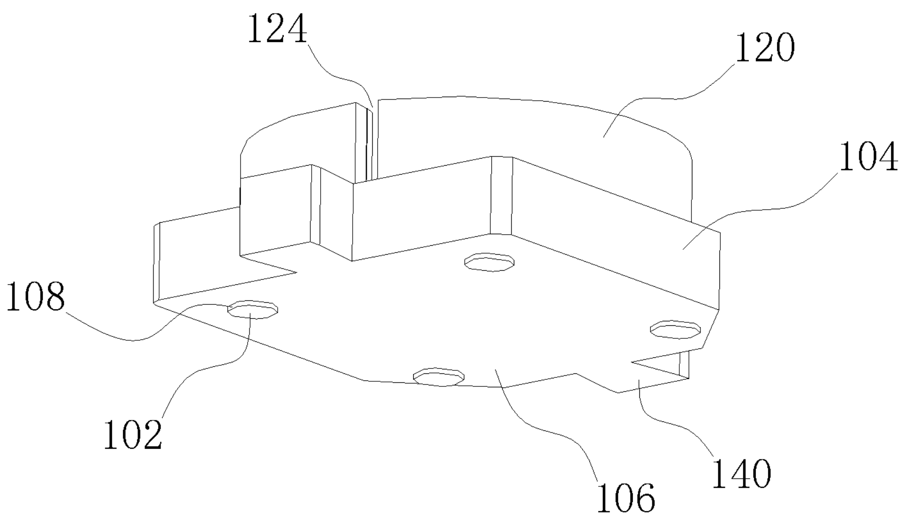
FIG. 3 is a diagonally three-dimensional structural bottom view of a pedestal with a shallow fixing receptacle provided in one example of the present disclosure.
Figure 4:
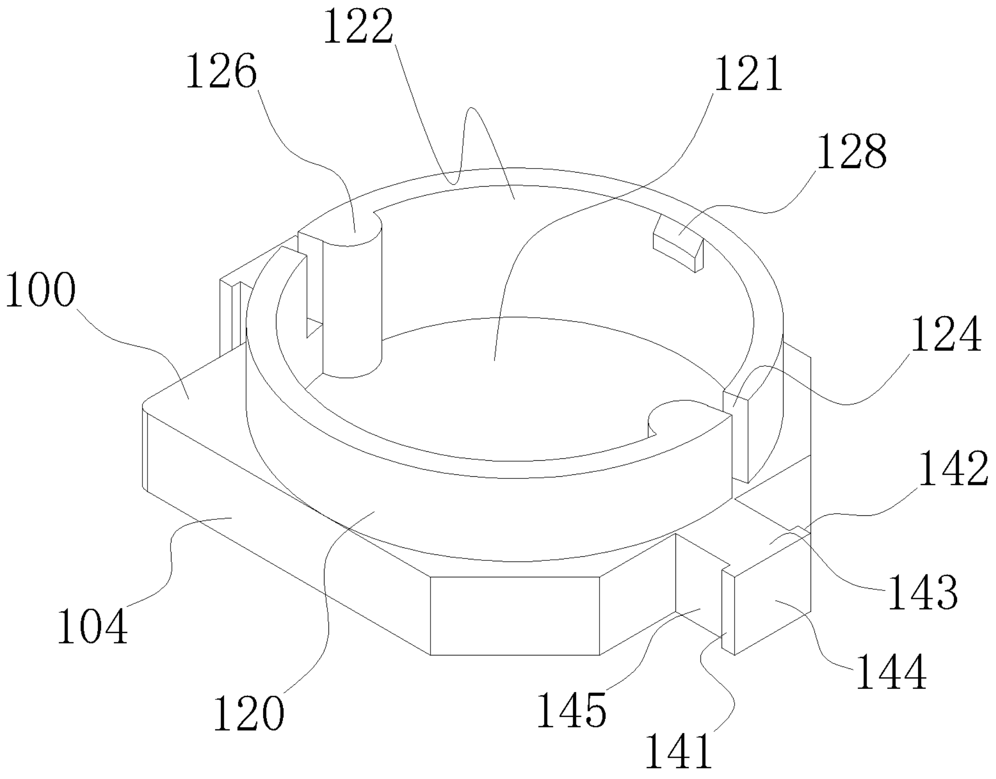
FIG. 4 is a diagonally three-dimensional structural top view of a pedestal with a relatively shallow fixing receptacle provided in one example of the present disclosure.
Figure 5:
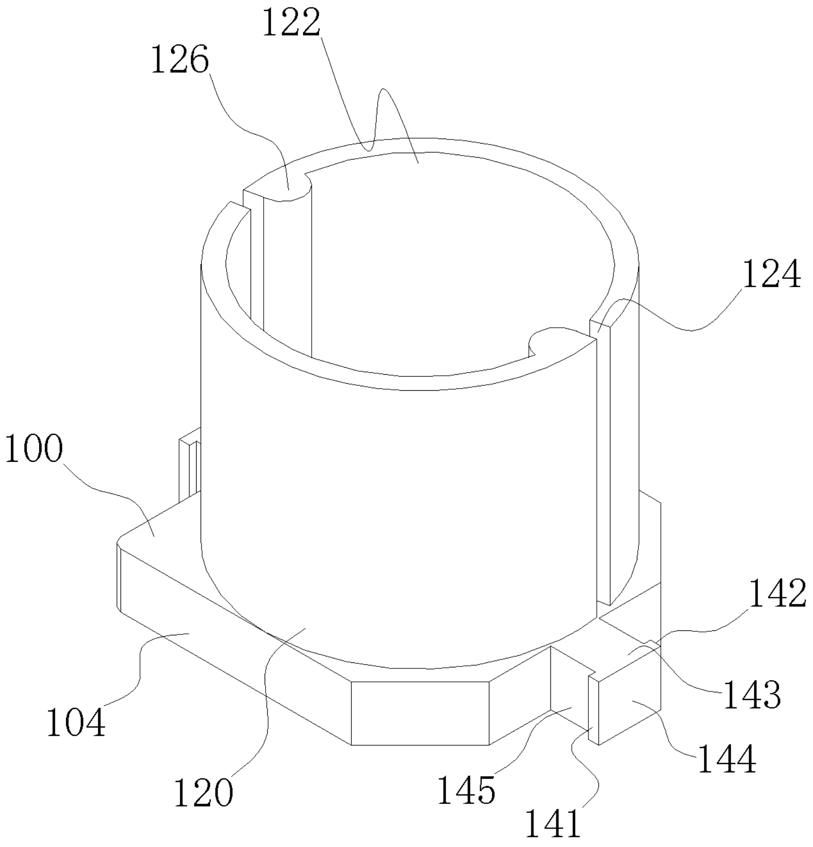
FIG. 5 is a diagonally three-dimensional structural top view of a pedestal with a relatively deep fixing receptacle provided in one example of the present disclosure.

Referring to FIG. 1 to FIG. 5, the fixing part 12 in this example may be structured as a fixing receptacle or structured in other ways as long as it can fix the main winding part 12. In this example, a fixing receptacle is described for example. As shown in FIG. 4 and FIG. 5, the fixing receptacle 12 (the reference numeral of the fixing part is used hereinafter for the convenience of description) in this example is disposed on the bearing surface 100. The fixing receptacle 12 typically has a wall 120, a bottom 121, and an opening 122 defined by the wall 120. A direction from the bottom to the opening is denoted as a first direction a, and the bearing surface 100, the fitting surface 102 and a welding surface 140 are all perpendicular to the first direction a.

The auxiliary winding part 14 extends away from the base 10 from the side surface 104.

A downward surface of the auxiliary winding part 14 is the welding surface 140. The auxiliary winding part 14 is used for winding an auxiliary coil 4, and the wound auxiliary coil 4 is required to overlay at least a portion of the welding surface 140 for the convenience of welding.

In this example, the welding surface 140 and the fitting surface 102 may be flush with each other, and may also have a height difference therebetween, which is similar to a step. But regardless of any structure, in the case that the auxiliary coil 4 is wound around the auxiliary winding part 14, a portion, covering the welding surface 140, of the auxiliary coil 4 is required to keep flush with or go beyond the fitting surface 102, so that the portion, covering the welding surface 140, of the auxiliary coil 4 fits on a PCB.

Figure 7:
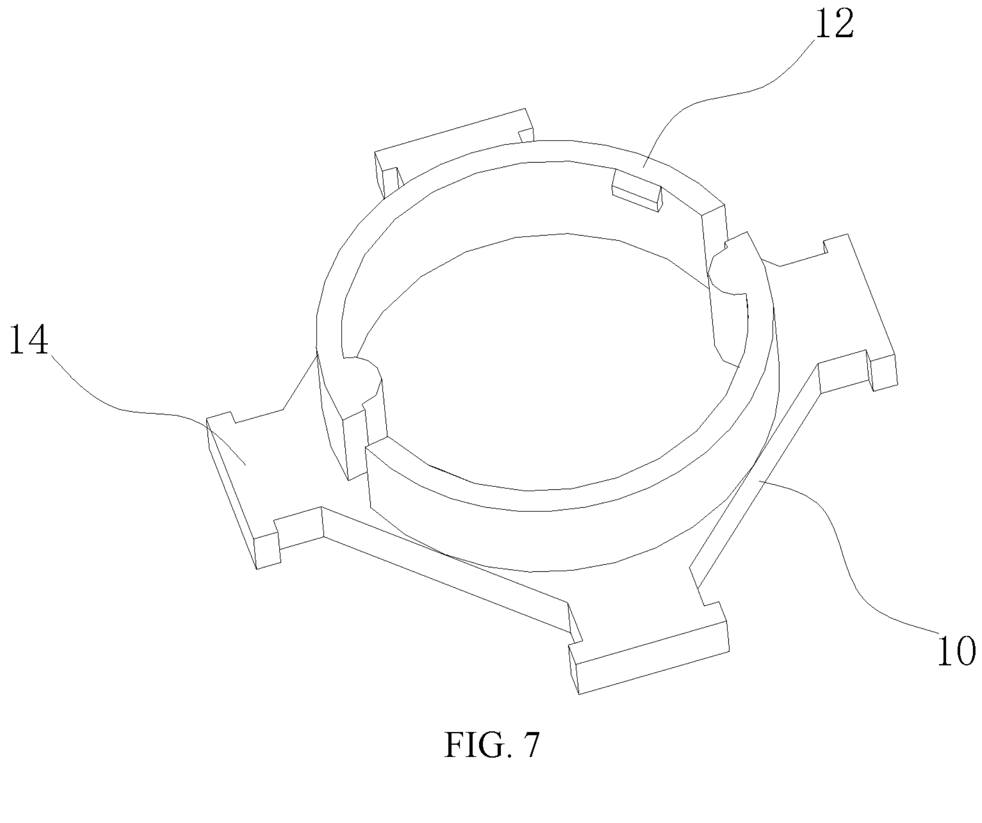
FIG. 7 is a diagonally three-dimensional structural top view of a pedestal with a square base provided in one example of the present disclosure.
Figure 8:
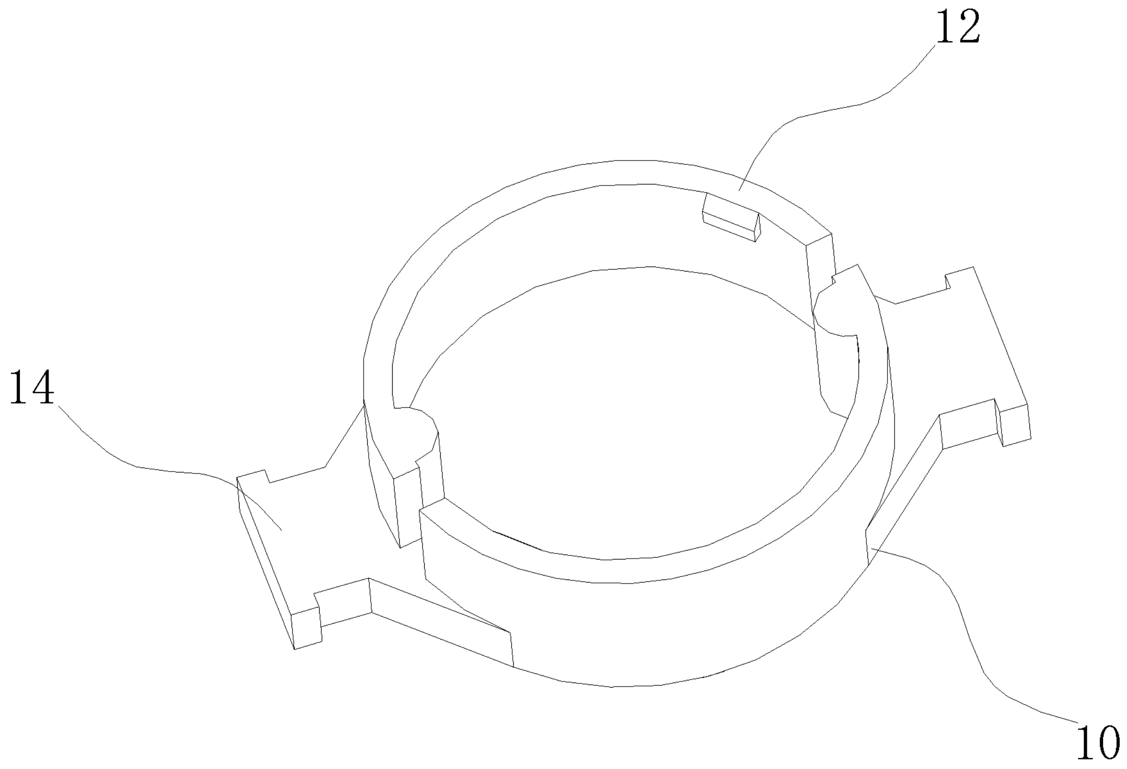
FIG. 8 is a diagonally three-dimensional structural top view of a pedestal with a circular base provided in one example of the present disclosure.

In a solution where a number of auxiliary winding parts 14 are distributed uniformly, for example, in a solution where four auxiliary winding parts 14 are uniformly distributed on four sides of the base 10 as shown in FIG. 7, a total area of the portions, covering the welding surface 140, of these auxiliary coils 4 is sufficient to make the inductor skeleton structure stably fit on a PCB, the portions, covering the welding surface 140, of the auxiliary coils 4 can either extend beyond the fitting surface 102 or keep flush with the fitting surface 102 in this solution.

In a solution where there are fewer auxiliary winding parts 14 (e.g., FIG. 1 to FIG. 5, and FIG. 8), due to a small area of the portions covering the welding surface 140 and uneven distribution of the auxiliary coils 4, the welding surface 140 may be slightly higher than the fitting surface 102, so that the portions, covering the welding surface 140, of the auxiliary coils 4 and the fitting surface 102 form a substantially flat contact junction surface.

For the above solutions, a variety of different implementations may be adopted. For example, in an implementation shown in FIG. 3, the base 10 has a bottom surface 106. The bottom surface 106 may directly serve as the fitting surface 102. In this case, there is a height difference, like a step, between the welding surface 140 and the bottom surface 106, so that the portions, covering the welding surface 140, of the auxiliary coils 4 and the fitting surface 102 form a substantially flat contact junction surface. The structure in such an implementation is complicated and not easy to form.

In another implementation shown in FIG. 3, to facilitate the formation of the above-mentioned height difference between the welding surface 140 and the fitting surface 102, it can be contemplated that the bottom surface 106 is flush with the welding surface 140 and a plurality of support feet 108 are disposed on the bottom surface 106. An end face, facing away from the bottom surface 106, of each of these support feet 108 will form the fitting surface 102 for contact with a PCB. The support feet 108 are easy to manufacture or dispose for their small size and simple structure.

In this example, there is no particular limitation on the shape of the auxiliary coil 4 as long as it can overlay a portion of the welding surface 140. For example, as shown in FIG. 4 and FIG. 5, the auxiliary coil may be wound circlewise on two vertical surfaces 141, 142 adjacent to the welding surface 140 and a surface 143 on a side, facing the bearing surface 100, of the auxiliary winding part 14, and may also be wound on the vertical surfaces 141, 142 and a vertical surface 144 on one side, facing away from the base 10, of the auxiliary winding part 14, or wound in other more complicated ways, which will not be described redundantly here.

To prevent the auxiliary coil 4 from unwinding from the auxiliary winding part 14, it is desirable to form a limit structure 145 on the auxiliary winding part 14. The limit structure 145 is used for constraining the auxiliary coil 4, thereby preventing the auxiliary coil 4 from unwinding from the auxiliary limit part 14. In this example, the limit structure 145 may be disposed on any surface of the auxiliary winding part 14. Since the auxiliary coil 4 is integrated, the whole auxiliary coil 4 may be prevented from unwinding from the auxiliary limit part 14 as long as any portion of the auxiliary coil 4 can be prevented from separation from the auxiliary limit part 14. However, to guarantee the welding effect, the welding surface 140 may be made as close to a PCB as possible when the inductance device is assembled. Thus, the limit structure 145 in this example may be disposed on other surface of the auxiliary winding part 14 than the welding surface 140.

In this example, the limit structure 145 may be in the form of a limit stop block, a limit stop plate, and the like, and the form of a limit groove is recommended. The limit groove 145 (the reference numeral of the limit structure is used hereinafter for the convenience of description) is capable of accommodating a portion of the auxiliary coil 4 such that this portion cannot be separated from the auxiliary winding part 14. An extension direction of the limit groove 145 may be the same as or perpendicular to or even inclined relative to the first direction a. Moreover, there may be more than one limit grooves 145. For example, the limit groove 145 may be formed in each of the vertical surfaces 141 and 142. Alternatively, the limit groove 145 extended in a direction the same as the first direction a may be formed in the vertical surface 141, while the limit groove 145 extended in a direction perpendicular to the first direction a may be formed in the vertical surface 144. A plurality of limit grooves 145 are combined to limit the position. A side, facing away from the welding surface 140, of the auxiliary winding part 14 is a surface 143. When the limit groove 145 is formed in the surface 143, this side may also serve as the bottom of the limit groove 145. In addition, a plurality of segments of limit grooves 145 may also be formed in the same surface, which will not be described one by one for example here.

Figure 6:
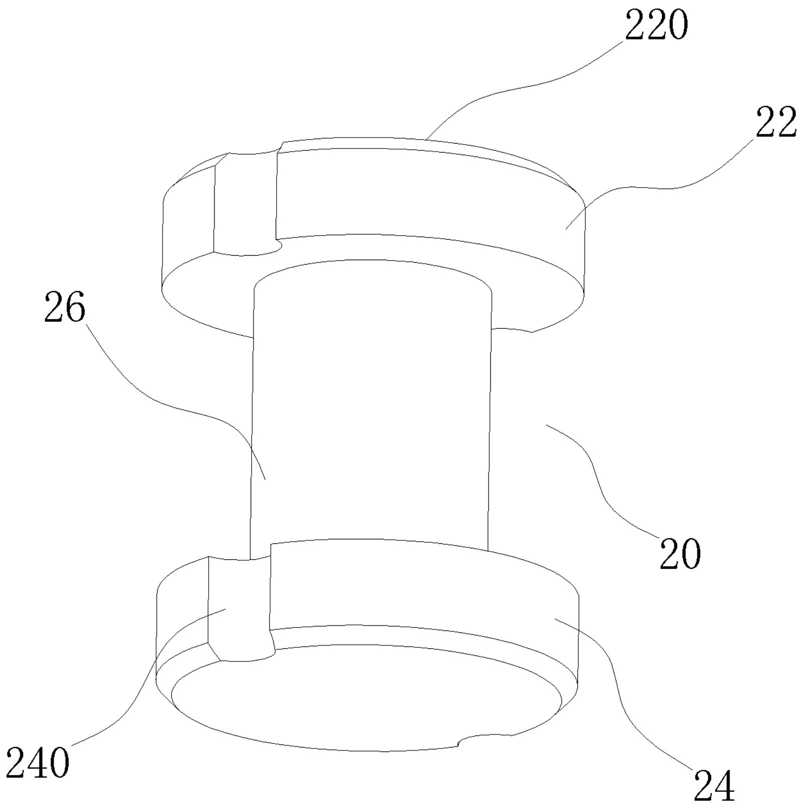
FIG. 6 is a specific structural view of a main winding part provided in one example of the present disclosure.

As shown in FIG. 2 and FIG. 6, the main winding portion 2 has a main winding groove 20 for winding a main coil 3. The main winding part 2 may be designed as a structure of a magnetic core (e.g., the magnetic core of an I-shaped inductance device) without any pin in the prior art. Moreover, the main winding part in this example may be of an integrated magnetic core structure. For example, the main winding part 2 may include an upper end portion 22, a lower end portion 24 and a main body portion 26. The main body portion 26 is located between the upper end portion 22 and the lower end portion 24. Edges of the upper end portion 22 and the lower end portion 24 are beyond the main body portion 26 and define together with the main body portion 26 the above-mentioned main winding groove 20. The main winding groove 20 is used for winding the main coil 3, and the upper end portion 22 and the lower end portion 24 are capable of constraining the form of the main coil 3 and preventing the main coil from unwinding from the main body portion 26.

In this example, the main winding part 2 is capable of allowing winding of the main coil 3 thereof on the one hand, and on the other hand, can be embedded in the fixing receptacle 12, so that the main winding part 2 and the pedestal 1 are combined to form an integrated skeleton structure and are respectively for winding the main coil 3 and the auxiliary coil 4 so as to form the inductance device. The pedestal 1 provides the inductance device with a flat fitting surface for fitting with a PCB.

To facilitate embedding of the main winding part 2 into the fixing receptacle 12, the lower end portion 24 may have a shape matching that of the fixing receptacle 12 so as to extend through the opening 122 and be embedded into the fixing receptacle 12, and in the case that the lower end portion 24 is embedded in the fixing receptacle 12, the lower end portion 24, the main body portion 26 and the upper end portion 22 are arranged in sequence in the first direction a.

In this example, when winding the main coil 3 and the auxiliary coil 4, the main coil 3 and the auxiliary coil 4 may be wound sequentially with the same enameled wire (see FIG. 2); the main coil 3 and the auxiliary coil 4 wound in such a way are electrically connected with one another, and power may be directly supplied to the main coil 3 through the auxiliary coil 4. In addition, the main coil 3 and the auxiliary coil 4 in this example may also be wound with different enameled wires, respectively. In this case, the auxiliary coil 4 is not in electrical connection relationship with the main coil 3, and the auxiliary coil 4 is merely used for fixation during welding.

Since the main coil 3 is required to have at least one input end and one output end, at least two of the auxiliary coils 4, under normal circumstances, and the main coil 3 are wound with the same enameled wire. The two auxiliary coils 4 may serve as the input end and the output end of the main coil 3, respectively. As a matter of course, to adapt to different application environments, the number of input ends and that of output ends of the main coil 3 may vary. In this case, the number of the auxiliary coils 4 electrically connected to the main coil 3 may be further increased.

When assembling the inductance device on a PCB, an enamel covering on the portion, covering the welding surface 140, of each auxiliary coil 4 is melted at a high temperature to expose a metal wire therein. At the high temperature, the metal wire will be melted and flow to a pad on the PCB. After the melt metal is cooled and solidified, the welding between the auxiliary coil 4 and the pad is completed. Compared with a traditional way of connection through pins, such an assembly way has higher efficiency. Furthermore, since the pad needs not have a region reserved for a pin to pass through in this case, the area of the pad can be greatly reduced and even the pad can be completely hidden under the inductance device, so that the area of the PCB can be greatly reduced.

As shown in FIG. 1 to FIG. 5, to improve the stability of assembly, two sides, symmetrical about the base 10, of the pedestal 1 may both extend to form the auxiliary winding parts 14, and the auxiliary coil 4 is wound around the auxiliary winding part 14 on each side. Thus, during welding, two sides of the inductance device may both be welded to a PCB by means of the auxiliary coils 4, thus resulting in higher stability. The number of the auxiliary winding parts 14 and that of the auxiliary coils 4 may be adjusted according to the desired structural strength and the requirement of electrical connection. Usually, the number of the auxiliary winding parts 14 may be between 2 and 5.

In this example, each auxiliary coil 4 is typically wound around one auxiliary winding part 14 individually. However, it is not excluded in this example that the auxiliary coils 4 are all wound around a plurality of auxiliary winding parts 14 on the same side of the base 10. For example, two auxiliary winding parts 14 on the same side may be used as two support points for the auxiliary coil 4, and an enameled wire is wound around the two auxiliary winding parts 14 to form a strip-shaped auxiliary coil 4. Such an auxiliary coil 4 has a larger welding area with a PCB and thus may have more excellent structural stability and electrical stability. As a matter of course, in addition to the two auxiliary winding parts 14 as support points for winding, the auxiliary coil 4 may further include other auxiliary winding part 14 in the middle thereof to support in the middle. Thus, a single auxiliary coil 4 may be wound around two or more auxiliary winding parts 14.

In addition, the enameled wire may be led from the surface 143 of one auxiliary winding part 14 to the surface 143 of another auxiliary winding part 14 or from the welding surface 140 of one auxiliary winding part 14 to the welding surface 140 of another auxiliary winding part 14, and may also be led from the surface 143/the welding surface 140 of one auxiliary winding part 14 to the surface 143/the welding surface 140 of another auxiliary winding part 14, thereby forming a single diagonal or cross structure. In addition to the structures described above, in some examples, an auxiliary winding part 14 may be lengthened and an enameled wire may be then wound around the lengthened auxiliary winding part 14 to form a strip-shaped auxiliary coil 4.

When winding an enameled wire to form the main coil 3, the input end and the output end of the main coil 3 are usually led out from two ends of the main coil 3. The input end and the output end of the main coil 3 are required to extend from the main winding groove 20 to the auxiliary winding parts 14 for continuously winding the auxiliary coils 4, and in the case that the input end or the output end of the main coil 3 is in a position near the lower end portion 24, it is usually located in the fixing receptacle 12. In this case, the input end or the output end needs to extend to the auxiliary winding part 14 after passing across the opening 122, which leads to increased difficulty of winding.

Therefore, to facilitate the extending of the enameled wire from the main winding groove 20 to the auxiliary winding part 14, as shown in FIG. 3 to FIG. 5, a wire passing gap 124 is formed in the wall 120 of the fixing receptacle 12 in a position corresponding to the auxiliary winding part 14, and the wire passing gap 124 extends to the opening 122 in the first direction a. Thus, each of the input end and the output end of the main coil 3 may pass through the wall 120 directly through the wire passing gap 124 without passing across the opening 122, which reduces difficulty of winding.

For the convenience of manufacturing, the outer contour of the lower end portion 24 is typically formed into a circular shape. Accordingly, to match the lower end portion 24, the inner contour of the fixing receptacle 12 is also formed into a circular shape. While such an outer contour is convenient to manufacture, it is easy to cause circumferential rotation of the lower end portion 24 around the center of the circular contour within the fixing receptacle 12, resulting in loosening and even unwinding of the enameled wire or the coil. To avoid this, as shown in FIG. 4 and FIG. 5, a circumferential limit piece 126 may be disposed on the fixing receptacle 12. Meanwhile, as shown in FIG. 6, a circumferential limit matching piece 240 is disposed on the lower end portion 24. The circumferential rotation of the lower end portion 24 around the above-mentioned center within the fixing receptacle 12 can be limited by means of matching of the circumferential limit piece 126 and the circumferential limit matching piece 240.

In this example, the circumferential limit piece 126 and the circumferential limit matching piece 240 may have any structure that can limit the circumferential rotation, and this example does not have any constraint or use restriction thereon. For example, the circumferential limit piece 126 may be a limit projection on the wall 120, while the circumferential limit matching piece 240 may be a limit notch matching the limit projection. Alternatively, the structure of the circumferential limit piece 126 may be interchangeable with that of the circumferential limit matching piece 240.

In this example, the circumferential limit piece 126 may be extend to the opening 122 of the fixing receptacle 12 in the first direction a, while the circumferential limit matching piece 240 may extend through two sides of the lower end portion 24 also in the first direction a. Thus, when embedding the lower end portion 24 into the fixing receptacle 12, the circumferential limit piece 126 and the circumferential limit matching piece 240 may also serve as guiding or positioning element, allowing for smoother embedding.

In this example, a plurality of or a plurality of groups of circumferential limit pieces 126 (two shown in FIG. 4 and FIG. 5) are circumferentially uniformly distributed on the fixing receptacle 12, while a plurality of or a plurality of groups of circumferential limit matching pieces 240 are circumferentially uniformly distributed on the lower end portion 24 correspondingly to the circumferential limit pieces 126. Since a plurality of or a plurality of groups of circumferential limit pieces 126 and circumferential limit matching pieces 240 are circumferentially distributed uniformly, the lower end portion 24 and the whole main winding portion 2 may be adjusted circumferentially in angle, so as to enable the input end and the output end of the main coil 3 to be aligned to the respective auxiliary winding parts 14, respectively.

In this example, the outer contour of the lower end portion 24 and the inner contour of the fixing receptacle 12 may also be non-circular, such as square, triangular, pentagonal and semicircular, and even the cross section of the upper end portion 22 and the main body portion 26 of the main winding part may also be kept in the same configuration with the lower end portion 24. In this case, the circumferential limit piece 126 and the circumferential limit matching piece 240 may be omitted from the main winding part 2, or it may be construed that the circumferential limit piece 126 and the circumferential limit matching piece 240 have become a portion of the fixing receptacle 12 and a portion of the lower end portion 24, respectively.

When the lower end portion 24 is embedded into the fixing receptacle 12, the fixing receptacle 12 may be clamped with the lower end portion 24 such that the lower end portion 24 can be tightly connected to the fixing receptacle 12. Any clamping structure that can realize detachable clamping may be disposed between the fixing receptacle 12 and the lower end portion 24. For example, as shown in FIG. 4, a clasp 128 may be disposed in the fixing receptacle 12. When the lower end portion 24 is embedded into the fixing receptacle 12, the clasp 128 may be clamped with the lower end portion 24. A bayonet or other structure matching the clasp 128 may be disposed on the lower end portion 24. Alternatively, no any additional structure is added, and the clasp 128 is directly clamped with the side, facing the upper end portion 22, of the lower end portion 24 by spanning over the lower end portion 24 after the lower end portion 24 is embedded in the fixing receptacle 12. In other examples, a clasp might also be disposed on the fixing receptacle 12, while a bayonet or other matching structure might be disposed on the lower end portion 24. These technical solutions can be implemented by a person skilled in the art according to this example without any effect on the clamping effect.

In this example, the depth (or height) of the fixing receptacle 12 might also have an impact on the overall performance of the inductance device. For example, to adapt to the surface mount production, an adsorption mechanism needs to be used when transferring the inductance device, and an adsorption surface easy to adsorb needs to be disposed on the inductance device. As shown in FIG. 6, a side surface, facing away from the lower end portion 24, of the upper end portion 22 is used as a flat adsorption surface 220 in this example. In order not to affect the adsorption effect, the depth (or height) of the fixing receptacle 12 needs to be limited, so that the fixing receptacle 12 is not beyond the adsorption surface 220 when the lower end portion 24 is embedded into the fixing receptacle 12.

In other cases than those described above, the inductance device provided in this example is typically used in an electrical apparatus such as a luminaire. For example, when the inductance device is used in a luminaire, the luminaire typically includes a lamp, a light source module, and a driving module. The lamp typically includes a housing and a front cover. The light source module and the driving module are both disposed on the lamp and electrically connected to each other. The light source module typically includes merely a light source board and a light-emitting diode (LED) chip disposed on the light source board, and the driving module includes a driving board, and a series of components disposed on the driving board, one of which is an inductance device.

Due to limited space of the luminaire, the components are arranged compactly, and the inductance device is a magnetic component, which might interfere with the normal operation of other components. Therefore, to avoid interference with other components, the fixing receptacle 12 and even the whole pedestal 1 in this example may be made of a magnetic shielding material such as a magnetic glue and a magnetic ferrite, and the depth (or height) of the fixing receptacle 12 is limited, so that the upper end portion 22 is not beyond the opening 122 when the lower end portion 24 is embedded into the fixing receptacle 12. In other words, the main winding part 2 is completely enclosed by the fixing receptacle 12. Since the fixing receptacle 12 is made of a magnetic shielding material, a magnetic field generated by the main winding part 2 and the main coil 3 can be effectively shielded from interference with other components.

In some luminaires, there might be a case where the light source board and the driving board are integrated. In this case, part of light rays emitted by the LED chip might be thrown on the inductance device. Usually, a magnetic material used for the inductance device has a deep color or even is black with extremely high light absorbance and low reflectance, thus leading to waste of a certain amount of light energy. In this example, the surface of one or even both of the pedestal 1 and the main winding part 2 may be coated with a light color (e.g., white) to form a reflective surface, thereby providing higher light reflectance. The surface color of the pedestal 1 and the main winding part 2 may be provided by adjusting the material of the pedestal 1 or the main winding part 2. Alternatively, the surface of the pedestal 1 and the main winding part 2 may be coated with a light color pigment.

For the convenience of production, in this example, the upper end portion 22 and the lower end portion 24 may be structurally symmetrical about the main body portion 26. Thus, the upper end portion 22 and the lower end portion 24 may be arbitrarily interchangeable in position to simplify the winding of the coil and the embedding of the main winding part 2.

To sum up, the inductor skeleton structure, the inductance device and the luminaire provided in the examples of the present disclosure can be adaptable to the surface mount technology, thereby improving the assembly efficiency.

In the first aspect, the present disclosure provides an inductor skeleton structure, comprising a pedestal and a main winding part. The pedestal comprises a base, a fixing part, and an auxiliary winding part, the fixing part is disposed on the base, the base comprises a downward fitting surface and a circumferential side surface surrounding the fitting surface, and the auxiliary winding part is extended away from the base from the side surface; the main winding part has a main winding groove for winding a main coil; the main winding part is fixed on a side, which is facing away from the fitting surface, of the base by the fixing part; a downward surface of the auxiliary winding part is a welding surface, and the auxiliary winding part is used for winding an auxiliary coil capable of covering at least a portion of the welding surface; and the welding surface and the fitting surface are configured such that the auxiliary coil covering the welding surface is flush with or beyond the fitting surface.

Optionally, in the above inductor skeleton structure, the side, which is facing away from the fitting surface, of the base is a bearing surface, and the fixing part is disposed on the bearing surface; the fixing part is a fixing receptacle, and the main winding part is capable of being embedded in the fixing receptacle; the fixing receptacle comprises a bottom, a wall, and an opening defined by the wall; a direction from the bottom to the opening is denoted as a first direction, and the bearing surface, the fitting surface and the welding surface are all perpendicular to the first direction.

Optionally, in the above inductor skeleton structures, the main winding part comprises an upper end portion, a lower end portion and a main body portion, the main body portion is between the upper end portion and the lower end portion, and edges of both the upper end portion and the lower end portion are beyond the main body portion and define together with the main body portion the main winding groove; the lower end portion is in a shape matching a shape of the fixing receptacle and is capable of being embedded in the fixing receptacle, and in a case that the lower end portion is embedded in the fixing receptacle, the lower end portion, the main body portion and the upper end portion are arranged in sequence along the first direction.

Optionally, in the above inductor skeleton structures, an inner contour of the fixing receptacle and an outer contour of the lower end portion are both in a circular shape, a circumferential limit piece is disposed on the fixing receptacle, and a circumferential limit matching piece is disposed on the lower end portion; and the lower end portion and the fixing receptacle are capable of being limited from rotation around a center of the circular shape by matching of the circumferential limit piece and the circumferential limit matching piece.

Optionally, in the above inductor skeleton structures, the circumferential limit piece is a limit projection on the wall, and the circumferential limit matching piece is a limit notch matching the limit projection.

Optionally, in the above inductor skeleton structures, the circumferential limit piece is extended to the opening along the first direction, and the circumferential limit matching piece is extended through two sides of the lower end portion along the first direction.

Optionally, in the above inductor skeleton structures, a plurality of or a plurality of groups of circumferential limit pieces are circumferentially uniformly distributed on the fixing receptacle, and a plurality of or a plurality of groups of circumferential limit matching pieces are circumferentially uniformly distributed on the lower end portion corresponding to the circumferential limit pieces.

Optionally, in the above inductor skeleton structures, a side surface, which is facing away from the lower end portion, of the upper end portion is a flat adsorption surface; and in a case that the lower end portion is embedded in the fixing receptacle, the fixing receptacle is not beyond the adsorption surface.

Optionally, in the above inductor skeleton structures, the fixing receptacle is formed of a magnetic shielding material; in the case that the lower end portion is embedded in the fixing receptacle, the upper end portion is not beyond the opening of the fixing receptacle.

Optionally, in the above inductor skeleton structures, the upper end portion and the lower end portion are structurally symmetrical about the main body portion.

Optionally, in the above inductor skeleton structures, a clasp is disposed in the fixing receptacle; in the case that the lower end portion is embedded in the fixing receptacle, the clasp is clamped with the lower end portion.

Optionally, in the above inductor skeleton structures, a wire passing gap is formed in the wall in a position corresponding to the auxiliary winding part, and the wire passing gap is extended to the opening of the fixing receptacle along the first direction.

Optionally, in the above inductor skeleton structures, the base has a bottom surface which serves as the fitting surface; the bottom surface is higher than the welding surface and a height difference between the bottom surface and the welding surface enables the auxiliary coil covering the welding surface to be flush with the fitting surface;

Optionally, in the above inductor skeleton structures, the base has a bottom surface which is flush with the welding surface; a plurality of support feet are disposed on the bottom surface; and an end face, which is facing away from the bottom surface, of each of plurality of support feet forms the fitting surface.

Optionally, in the above inductor skeleton structures, a limit structure is further disposed on the auxiliary winding part to prevent the auxiliary coil wound around the auxiliary limit part from unwinding from the auxiliary winding part.

Optionally, in the above inductor skeleton structures, the limit structure is a limit groove for accommodating a portion of the auxiliary coil.

Optionally, in the above inductor skeleton structures, an extension direction of the limit groove is same as and/or perpendicular to the first direction.

Optionally, in the above inductor skeleton structures, each of two sides, which are symmetrical about the fixing receptacle, of the base is extended to form the auxiliary winding part.

Optionally, in the above inductor skeleton structures, the main winding part is a magnetic core of an I-shaped inductance device.

Optionally, in the above inductor skeleton structures, a surface of the pedestal and/or the main winding part is a reflective surface.

In the second aspect, the present disclosure provides an inductance device, comprising a main coil, an auxiliary coil, and the above-mentioned inductor skeleton structure. The main coil is wound within the main winding groove, and the auxiliary coil is wound around the auxiliary winding part and covers the portion of the welding surface.

Optionally, in the above inductance device, the main coil and the auxiliary coil are wound with a single enameled wire or different enameled wires.

Optionally, in the above inductance devices, a count of the auxiliary coil is at least two, and the main coil and the at least two auxiliary coils are wound with a single enameled wire.

Optionally, in the above inductance devices, at least one of the auxiliary coils is individually wound around one auxiliary winding part.

Optionally, in the above inductance devices, at least one of the auxiliary coils is wound around a plurality of auxiliary winding parts on a same side of the base.

In the third aspect, the present disclosure provides a luminaire, comprising a lamp, a light source module and a driving module. The light source module and the driving module are both disposed on the lamp and electrically connected to each other; the driving module comprises a driving board; and the above-mentioned inductance device is disposed on the driving board.

Optionally, in the above luminaire, the light source module comprises a light source board which is integrated with the driving board; and a surface of the pedestal and/or the main winding part is a reflective surface.

At least one of the above technical solutions adopted by the present disclosure can achieve following beneficial effects.

In the inductor skeleton structure and the inductance device provided by examples of the present disclosure, the main winding part is assembled with the pedestal to form a flat contact surface to adapt to the surface mount technology, thereby improving the assembly efficiency.

The foregoing description of each example of the present disclosure focuses on the differences from other example. Different optimized features of various examples can be combined to derive a better example as long as they do not contradict each other, which will not be reiterated here in consideration of simplicity of wording.

The foregoing is merely illustrative of the examples of the present disclosure and is not intended to limit the present disclosure. Various changes and modifications can be made to the present disclosure by those skilled in the art. Any modifications, equivalent replacements, improvements, etc. made within the spirit and scope of the present disclosure should be included within the protection scope of the present disclosure.

The invention claimed is:

1. An inductor skeleton structure, comprising a pedestal and a main winding part, wherein the pedestal comprises a base, a fixing receptacle, and an auxiliary winding part, the fixing receptacle is disposed on the base, the base comprises a fitting surface for fitting with a printed circuit board (PCB) and a circumferential side surface surrounding the fitting surface, and the auxiliary winding part is extended away from the base from the circumferential side surface;

wherein the main winding part comprises a main winding groove for winding a main coil, an upper end portion, a lower end portion, and a main body portion;

the main winding part is fixed on a side, which is facing away from the fitting surface, of the base by the fixing receptacle; a downward surface of the auxiliary winding part comprises a welding surface for welding, and the auxiliary winding part is used for winding an auxiliary coil capable of covering at least a portion of the welding surface;

the welding surface and the fitting surface are configured such that the auxiliary coil covering the welding surface is positioned to be flush with the fitting surface or beyond the fitting surface; and an inner contour of the fixing receptacle and an outer contour of the lower end portion are both in a circular shape, a circumferential limit piece is disposed on the fixing receptacle, and a circumferential limit matching piece is disposed on the lower end portion; and the lower end portion and the fixing receptacle are capable of being limited from rotation around a center of the circular shape by matching of the circumferential limit piece and the circumferential limit matching piece.

2. The inductor skeleton structure according to claim 1, wherein the side, which is facing away from the fitting surface, of the base is a bearing surface, and the fixing receptacle is disposed on the bearing surface;

the main winding part is capable of being embedded in the fixing receptacle; the fixing receptacle comprises a bottom, a wall, and an opening defined by the wall; a direction from the bottom to the opening is denoted as a first direction, and the bearing surface, the fitting surface and the welding surface are all perpendicular to the first direction.

3. The inductor skeleton structure according to claim 2, wherein the main body portion is between the upper end portion and the lower end portion, and edges of both the upper end portion and the lower end portion are beyond the main body portion and define together with the main body portion the main winding groove;

the lower end portion is in a shape matching a shape of the fixing receptacle and is capable of being embedded in the fixing receptacle, and in a case that the lower end portion is embedded in the fixing receptacle, the lower end portion, the main body portion and the upper end portion are arranged in sequence along the first direction.

4. The inductor skeleton structure according to claim 2, wherein the circumferential limit piece is a limit projection on the wall, and the circumferential limit matching piece is a limit notch matching the limit projection; and the circumferential limit piece is extended to the opening along the first direction, and the circumferential limit matching piece is extended through two sides of the lower end portion along the first direction.

5. The inductor skeleton structure according to claim 1, wherein a plurality of or a plurality of groups of circumferential limit pieces are circumferentially uniformly distributed on the fixing receptacle, and a plurality of or a plurality of groups of circumferential limit matching pieces are circumferentially uniformly distributed on the lower end portion corresponding to the circumferential limit pieces.

6. The inductor skeleton structure according to claim 1, wherein a side surface, which is facing away from the lower end portion, of the upper end portion comprises a flat adsorption surface for use in adsorption by an adsorption mechanism; and in a case that the lower end portion is embedded in the fixing receptacle, the fixing receptacle is not beyond the flat adsorption surface.

7. The inductor skeleton structure according to claim 1, wherein the fixing receptacle is formed of a magnetic shielding material; in the case that the lower end portion is embedded in the fixing receptacle, the upper end portion is not beyond the opening of the fixing receptacle; and the upper end portion and the lower end portion are structurally symmetrical about the main body portion.

8. The inductor skeleton structure according to claim 1, wherein in the case that the lower end portion is embedded in the fixing receptacle, the fixing receptacle is clamped with the lower end portion.

9. The inductor skeleton structure according to claim 2, wherein a wire passing gap is formed in the wall in a position corresponding to the auxiliary winding part, and the wire passing gap is extended to the opening of the fixing receptacle along the first direction.

10. The inductor skeleton structure according to claim 1, wherein the base has a bottom surface which serves as the fitting surface; the bottom surface is higher than the welding surface and a height difference between the bottom surface and the welding surface enables the auxiliary coil covering the welding surface to be flush with the fitting surface;

alternatively, the base has a bottom surface which is flush with the welding surface; a plurality of support feet are disposed on the bottom surface; and an end face, which is facing away from the bottom surface, of each of plurality of support feet forms the fitting surface.

11. The inductor skeleton structure according to claim 1, wherein a limit structure is further disposed on the auxiliary winding part to prevent the auxiliary coil wound around the auxiliary limit part from unwinding from the auxiliary winding part.

12. The inductor skeleton structure according to claim 11, wherein the limit structure is a limit groove for accommodating a portion of the auxiliary coil; an extension direction of the limit groove is same as and/or perpendicular to the first direction; and each of two sides, which are symmetrical about the fixing receptacle, of the base is extended to form the auxiliary winding part.

13. The inductor skeleton structure according to claim 1, wherein a surface of the pedestal and/or the main winding part comprises a reflective surface configured to provide light reflectance.

14. An inductance device, comprising the inductor skeleton structure according to claim 1, the main coil, and the auxiliary coil, wherein the main coil is wound within the main winding groove, and the auxiliary coil is wound around the auxiliary winding part and covers the portion of the welding surface.

15. The inductance device according to claim 14, wherein the main coil and the auxiliary coil are wound with a single enameled wire or different enameled wires.

16. The inductance device according to claim 15, wherein a count of the auxiliary coil is at least two, and the main coil and the at least two auxiliary coils are wound with a single enameled wire.

17. The inductance device according to claim 16, wherein at least one of the auxiliary coils is individually wound around one auxiliary winding part;

alternatively, at least one of the auxiliary coils is wound around a plurality of auxiliary winding parts on a same side of the base.

* * * * *